United States Patent
Anderson

(10) Patent No.: US 9,256,433 B2
(45) Date of Patent: Feb. 9, 2016

(54) SYSTEMS AND METHODS FOR MOVE ELIMINATION WITH BYPASS MULTIPLE INSTANTIATION TABLE

(71) Applicant: Intel Corporation, Santa Clara, CA (US)

(72) Inventor: Jeremy Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 13/840,462

(22) Filed: Mar. 15, 2013

(65) Prior Publication Data

US 2014/0281432 A1 Sep. 18, 2014

(51) Int. Cl.
*G06F 9/30* (2006.01)
*G06F 9/00* (2006.01)

(52) U.S. Cl.
CPC .................................. *G06F 9/30181* (2013.01)

(58) Field of Classification Search
None
See application file for complete search history.

(56) References Cited

U.S. PATENT DOCUMENTS

| | | | |
|---|---|---|---|
| 5,838,941 A | 11/1998 | Valentine et al. | |
| 2009/0327661 A1* | 12/2009 | Sperber | G06F 9/30098 712/217 |
| 2011/0208918 A1 | 8/2011 | Raikin et al. | |
| 2012/0005459 A1 | 1/2012 | Fleischman et al. | |
| 2014/0006830 A1 | 1/2014 | Kamhi et al. | |

OTHER PUBLICATIONS

Search and Examination Report received for United Kingdom Patent Application No. 1402777.5, mailed on Jul. 30, 2014, 5 pages.
Kadgi et al., U.S. Appl. No. 13/861,009, filed Apr. 11, 2013, titled "Systems and Methods for Flag Tracking in Move Elimination Operations", 67 pages.

* cited by examiner

*Primary Examiner* — Scott Sun

(74) *Attorney, Agent, or Firm* — Lowenstein Sandler LLP

(57) ABSTRACT

Systems and methods for move operation elimination with bypass Multiple Instantiation Table (MIT) logic. An example processing system may comprise a first data structure configured to store a plurality of physical register values; a second data structure configured to store a plurality of pointers, each pointer referencing an element of the first data structure; a third data structure including a plurality of move elimination sets, each move elimination set comprising a plurality of bits representing a plurality of logical registers; and a logic configured to perform a data manipulation operation by causing an element of the second data structure to reference an element of the first data structure, the logic further configured to reflect results of two or more data manipulation operations by performing a single update of the third data structure.

20 Claims, 14 Drawing Sheets

Move eliminate AX -> DX

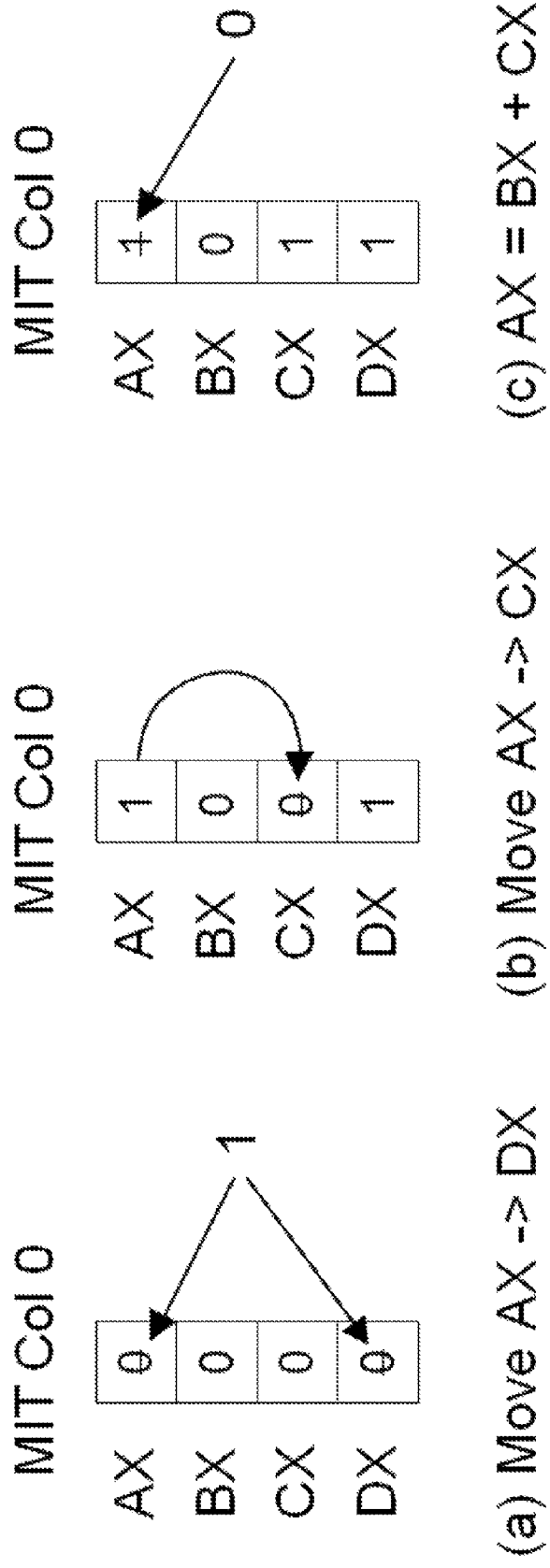

MIT — Cycle N

| Col | 0 | 1 | 2 | 3 |
|---|---|---|---|---|
| AX | 0 | 0 | 0 | 0 |
| BX | 0 | 0 | 0 | 0 |
| CX | 1 | 0 | 0 | 0 |
| DX | 1 | 0 | 0 | 0 |
| R8 | 0 | 0 | 0 | 0 |
| R9 | 0 | 0 | 0 | 0 |
| Empty | 0 | 1 | 1 | 1 |
| Rsv | 0 | 0 | 0 | 0 |
| Free | 0 | 1 | 1 | 1 |

MOV AX, CX
MOV R9, R8

FIG. 7a

MIT — Cycle N+1

| Col | 0 | 1 | 2 | 3 |
|---|---|---|---|---|
| AX | 0 | 0 | 0 | 0 |
| BX | 0 | 0 | 0 | 0 |
| CX | 1 | 0 | 0 | 0 |
| DX | 1 | 0 | 0 | 0 |
| R8 | 0 | 0 | 0 | 0 |
| R9 | 0 | 0 | 0 | 0 |
| Empty | 0 | 1 | 1 | 1 |
| Rsv | 0 | 1 | 1 | 0 |
| Free | 0 | 1 | 0 | 1 |

MOV BX, DX
MOV AX, R8

FIG. 7b

MIT — Cycle N+2

| Col | 0 | 1 | 2 | 3 |
|---|---|---|---|---|
| AX | 1 | 0 | 0 | 0 |
| BX | 0 | 0 | 0 | 0 |
| CX | 1 | 0 | 0 | 0 |
| DX | 1 | 0 | 0 | 0 |
| R8 | 0 | 0 | 1 | 0 |
| R9 | 0 | 0 | 1 | 0 |
| Empty | 0 | 1 | 0 | 1 |
| Rsv | 0 | 0 | 0 | 1 |
| Free | 0 | 1 | 0 | 0 |

FIG. 7c

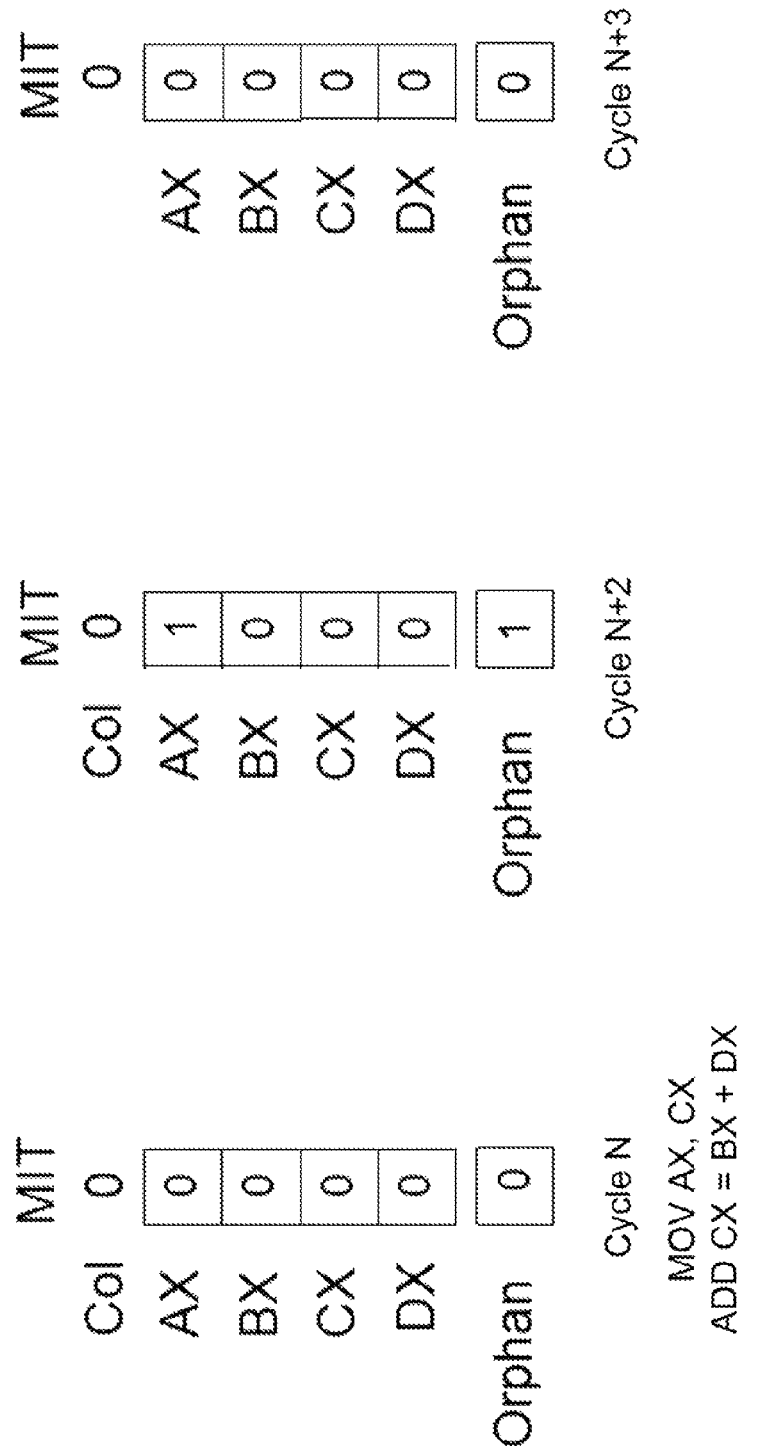

| Col | 0 | 1 | 2 | 3 |
|-----|---|---|---|---|
| AX  | 0 | 0 | 0 | 0 |
| BX  | 0 | 0 | 0 | 0 |
| CX  | 0 | 0 | 0 | 0 |
| DX  | 0 | 0 | 0 | 0 |

Initial State –
uop0: MOV AX -> BX
uop1: MOV BX -> CX

FIG. 9a

| Col | 0 | 1 | 2 | 3 |
|-----|---|---|---|---|
| AX  | 0 | 0 | 0 | 0 |
| BX  | 0 | 0 | 0 | 0 |
| CX  | 0 | 0 | 0 | 0 |
| DX  | 0 | 0 | 0 | 0 |

| Alloc[uop0] | 1 | 0 | 0 | 0 |
| Copy[uop0]  | 0 | 0 | 0 | 0 |
| Alloc[uop1] | 0 | 0 | 1 | 0 |
| Copy[uop1]  | 0 | 0 | 0 | 0 |

MIT Copy/Allocate

FIG. 9b

| Col | 0 | 1 | 2 | 3 |
|-----|---|---|---|---|
| AX  | 0 | 1 | 0 | 0 |
| BX  | 1 | 1 | 0 | 0 |
| CX  | 1 | 1 | 0 | 0 |
| DX  | 0 | 0 | 0 | 0 |

| Update[uop0] | 1 | 0 | 0 | 0 |
| Update[uop1] | 1 | 0 | 0 | 0 |

MIT Bypass and Update

| Col | 0 | 1 | 2 | 3 |
|-----|---|---|---|---|
| AX  | 0 | 1 | 0 | 0 |
| BX  | 0 | 0 | 0 | 0 |
| CX  | 0 | 1 | 0 | 0 |
| DX  | 0 | 0 | 0 | 0 |

Initial State –
uop0: MOV DX -> BX
uop1: MOV DX -> AX

FIG. 10b

| Col | 0 | 1 | 2 | 3 |
|-----|---|---|---|---|
| AX  | 0 | 1 | 0 | 0 |
| BX  | 0 | 0 | 0 | 0 |
| CX  | 0 | 1 | 0 | 0 |
| DX  | 0 | 0 | 0 | 0 |

| Col | 0 | 1 | 2 | 3 |
|-----|---|---|---|---|
| AX  | 0 | 1 | 0 | 0 |
| BX  | 0 | 0 | 0 | 0 |
| CX  | 0 | 0 | 1 | 0 |
| DX  | 0 | 0 | 0 | 0 |

Alloc[uop0]
Copy[uop0]
Alloc[uop1]
Copy[uop1]

MIT Copy/Allocate

FIG. 10c

| Col | 0 | 1 | 2 | 3 |
|-----|---|---|---|---|
| AX  | 0 | 0 | 0 | 0 |
| BX  | 0 | 1 | 0 | 0 |
| CX  | 1 | 0 | 0 | 0 |
| DX  | 0 | 1 | 0 | 0 |

| Col | 0 | 1 | 2 | 3 |
|-----|---|---|---|---|
| AX  | 0 | 1 | 0 | 0 |
| BX  | 0 | 1 | 0 | 0 |

Update[uop0]
Update[uop1]

MIT Bypass and Update

FIG. 11a

| Col | 0 | 1 | 2 | 3 |
|-----|---|---|---|---|
| AX  | 1 | 0 | 0 | 0 |
| BX  | 0 | 1 | 0 | 0 |
| CX  | 0 | 0 | 1 | 0 |
| DX  | 0 | 0 | 0 | 1 |

Initial State
uop0: MOV AX -> BX
uop1: ADD BX = CX + DX
uop2: MOV BX -> CX

FIG. 11b

Alloc[uop0]:

| Col | 0 | 1 | 2 | 3 |
|-----|---|---|---|---|
| AX  | 1 | 0 | 0 | 0 |
| BX  | 0 | 1 | 0 | 0 |
| CX  | 0 | 0 | 1 | 0 |
| DX  | 0 | 0 | 0 | 1 |

Copy[uop0]:

| Col | 0 | 1 | 2 | 3 |
|-----|---|---|---|---|
| AX  | 1 | 0 | 0 | 0 |
| BX  | 1 | 0 | 0 | 0 |
| CX  | 0 | 0 | 1 | 0 |
| DX  | 0 | 0 | 0 | 1 |

Alloc[uop1], Copy[uop1], Alloc[uop2], Copy[uop2]:

(see figure)

MIT Copy/Allocate

FIG. 11c

Update[uop0], Update[uop1], Update[uop2]:

| Col | 0 | 1 | 2 | 3 |
|-----|---|---|---|---|
| AX  | 1 | 0 | 0 | 0 |
| BX  | 0 | 0 | 1 | 0 |
| CX  | 0 | 0 | 1 | 0 |
| DX  | 0 | 0 | 0 | 1 |

MIT Bypass/Update

SYSTEMS AND METHODS FOR MOVE ELIMINATION WITH BYPASS MULTIPLE INSTANTIATION TABLE

TECHNICAL FIELD

The present disclosure is generally related to computer systems, and is specifically related to improving efficiency of executing data copying instructions by computer systems.

BACKGROUND

Data copying operations between physical registers represent a significant portion of operations performed by a processor. Hence, optimizing their execution may increase the overall performance of the processor.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 6a-6c schematically illustrate using Multiple Instantiation Table (MIT) for Physical Register File (PRF) entry tracking, in accordance with one or more aspects of the present disclosure;

FIGS. 7a-7c schematically illustrate MIT allocation and reservation logic, in accordance with one or more aspects of the present disclosure;

FIGS. 8a-8c schematically illustrate MIT orphan reclamation logic, in accordance with one or more aspects of the present disclosure;

FIGS. 9a-9c, 10a-10c, and 11a-11c schematically illustrate several examples of data manipulation operations implemented by a bypass MIT logic, in accordance with one or more aspects of the present disclosure;

DETAILED DESCRIPTION

Figure 1:
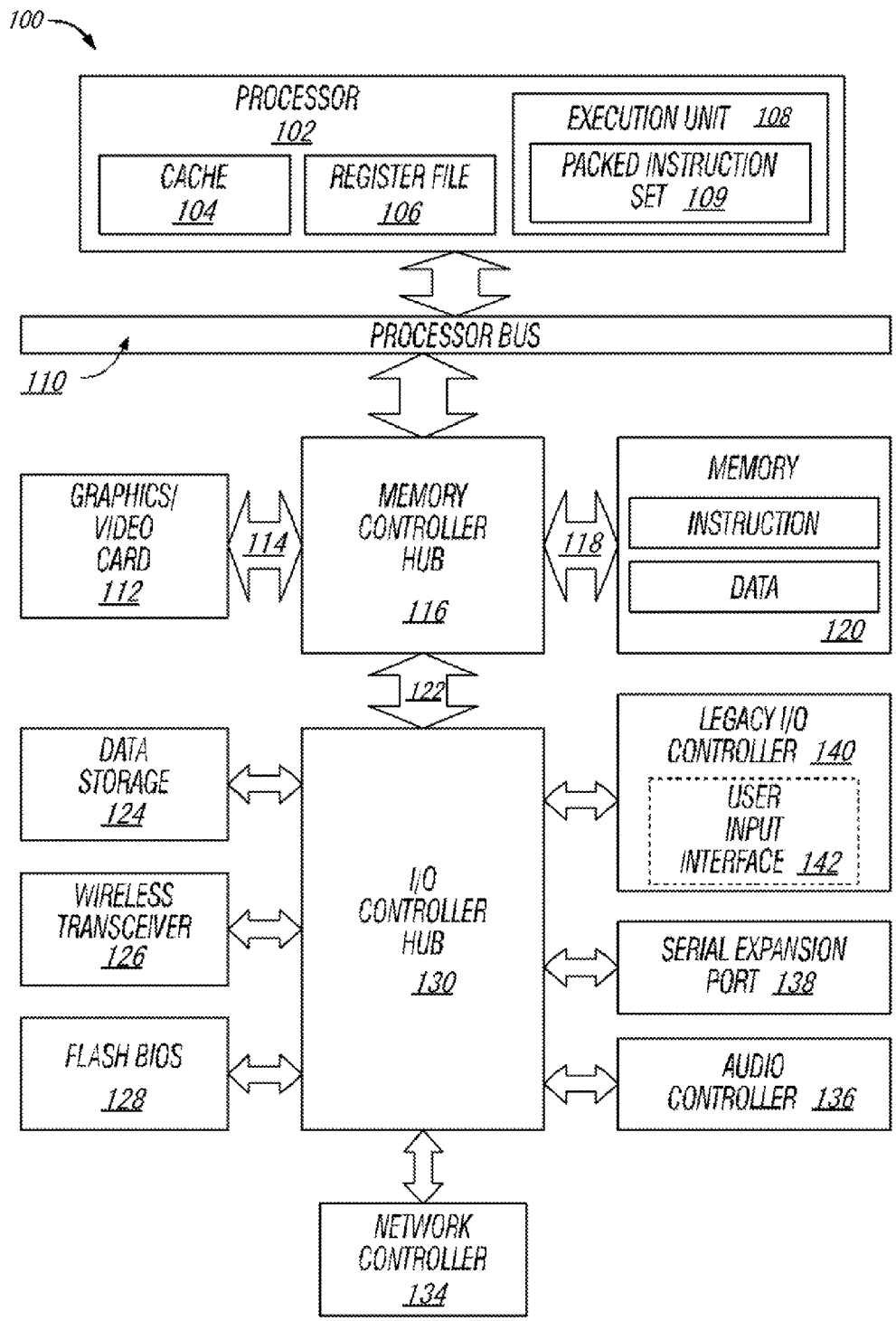
FIG. 1 depicts a high-level component diagram of an example computer system, in accordance with one or more aspects of the present disclosure.

Described herein are computer systems and related technologies for implementing move elimination with bypass Multiple Instantiation Table (MIT) logic. "Move elimination" herein shall refer to executing a register copying operation without employing the execution unit (e.g., by modifying an entry in a register alias table).

A processor may, for improving efficiency of instruction execution, implement register aliasing: a first data structure referred to as Physical Register File (PRF) may be employed to store physical register values, and a second data structure referred to as Register Alias Table (RAT) may be employed to store pointers mapping logical register identifiers (such as, for example, R8 or AX) to the values stored in the PRF. Register aliasing allows executing certain instructions by modifying entries in the alias table without sending those instructions to the execution unit. Examples of such instructions include register zeroing instructions (such as, for example, XOR AX, AX) and register copying instructions (such as MOV instructions). Because a register copying instruction does not create a new value, the source register pointer may be copied into the destination register pointer in the RAT, so that the instruction would not need to employ the execution unit and another PRF entry. This process is referred to as "move elimination," since the move instruction is eliminated from the stream sent to the execution unit.

In the above described register aliasing scheme, the usage of PRF table entries may need to be tracked in order to determine when a PRF entry may be released for use by a new instruction. A third data structure, referred to as Multiple Instantiation Table (MIT), may be employed to track the usage of PRF table entries, as described in more details herein below.

Systems and methods described herein may pre-compute dependencies for two or more data manipulation operations and then perform a single MIT update to reflect the results of the two or more operations, thus improving both timing and power consumption aspects of the move elimination operations. Various aspects of the above referenced methods and systems are described in details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processor cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

FIG. 1 depicts a high-level component diagram of one example of a computer system in accordance with one or more aspects of the present disclosure. A computer system 100 may include a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
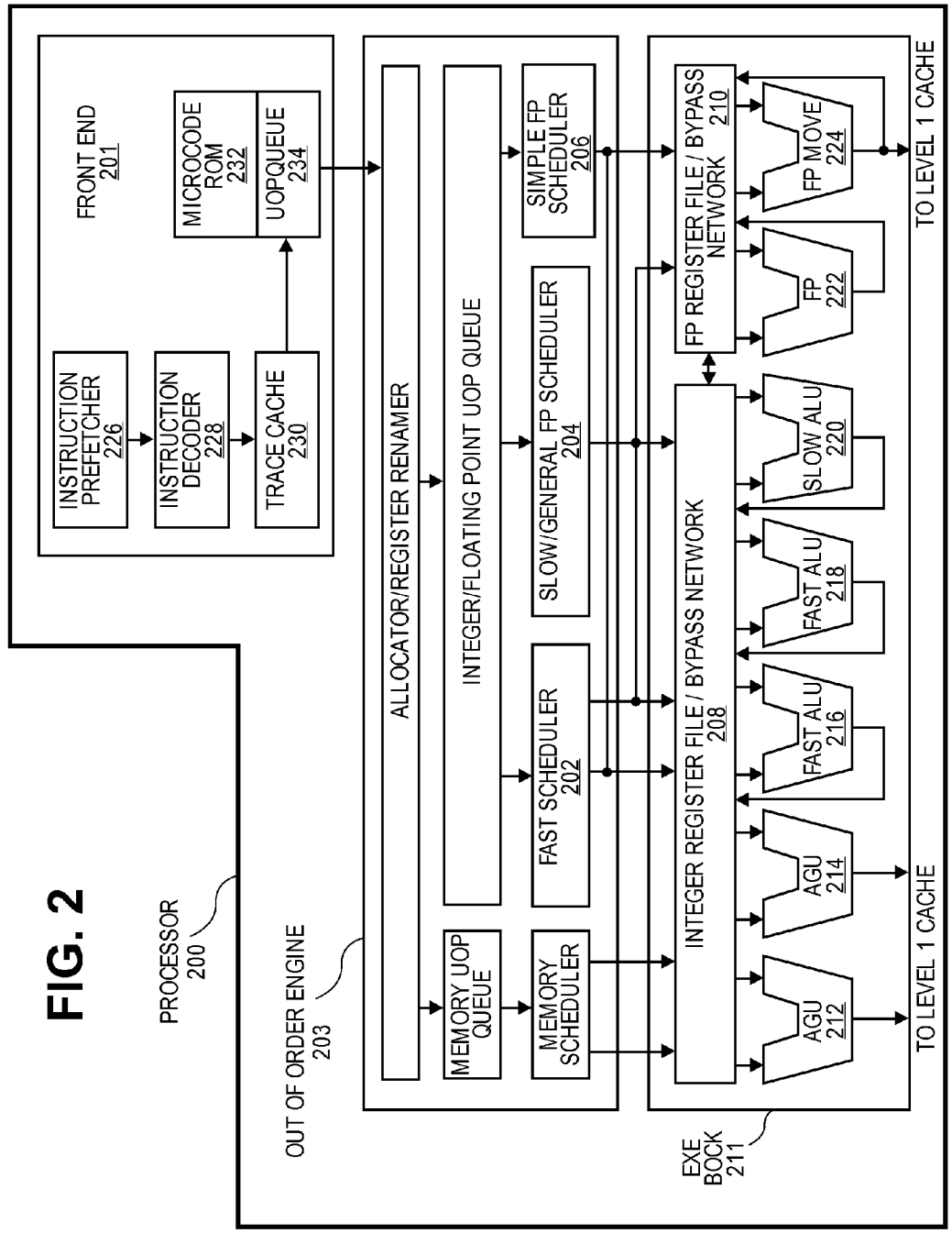
FIG. 2 depicts a block diagram of a processor, in accordance with one or more aspects of the present disclosure.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro-ops or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the microcode ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
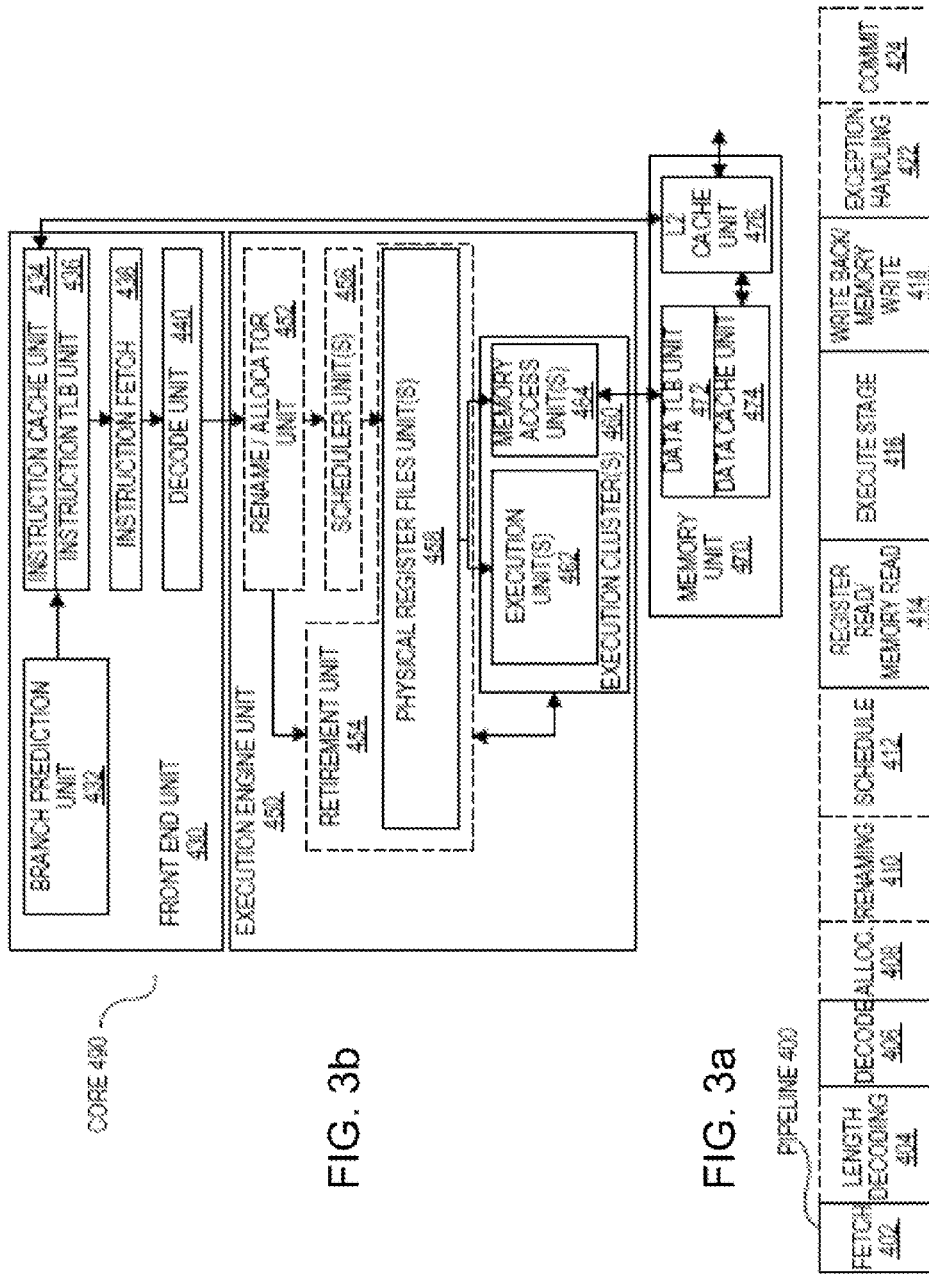
FIGS. 3a-3b schematically illustrate elements of a processor micro-architecture, in accordance with one or more aspects of the present disclosure.

FIGS. 3a-3b schematically illustrate elements of a processor micro-architecture, in accordance with one or more aspects of the present disclosure. In FIG. 3a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 3b, arrows denote a coupling between two or more units and the direction of the arrow indicates a direction of data flow between those units. FIG. 3b shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2

(L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
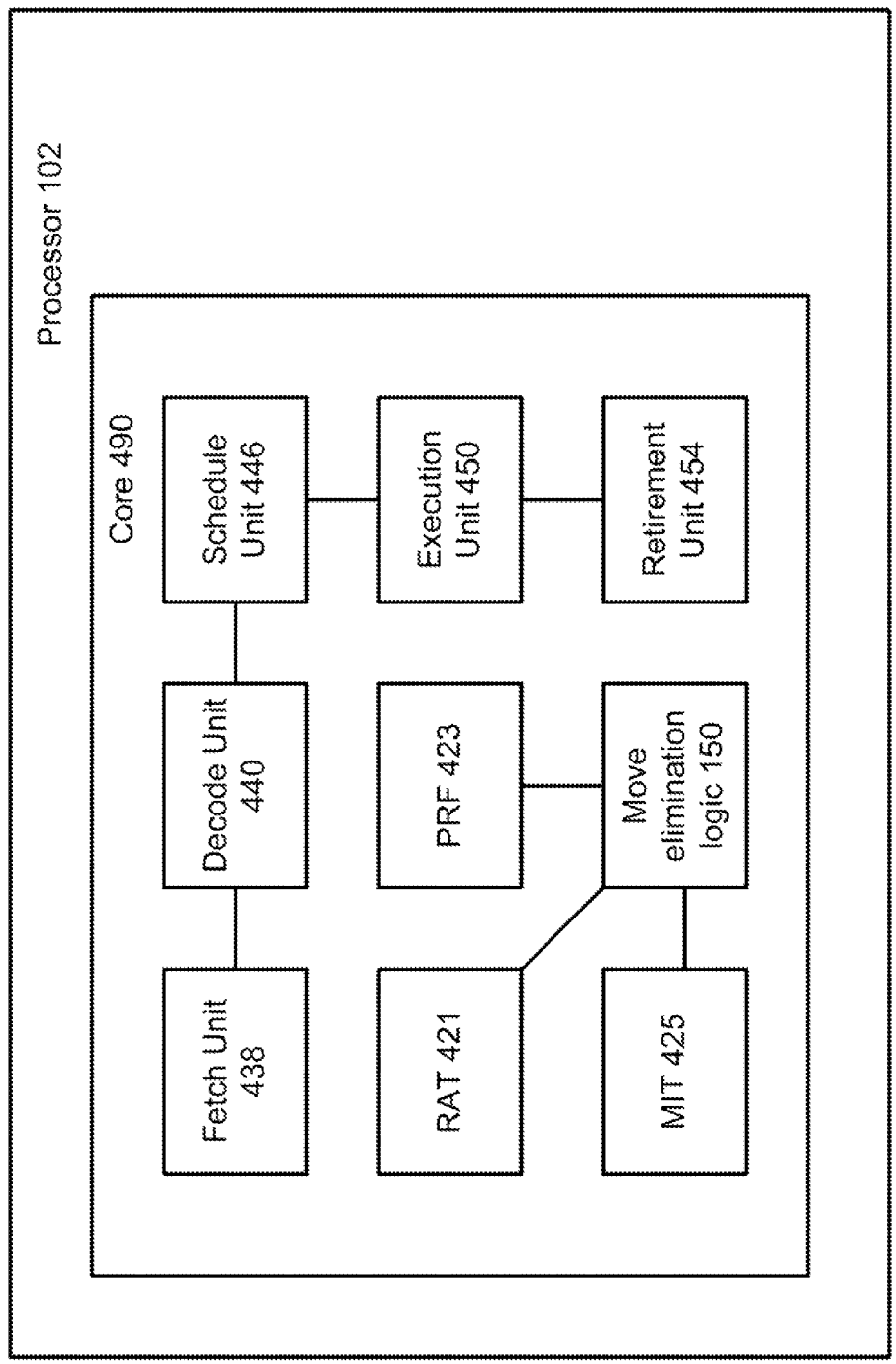
FIG. 4 schematically illustrates several aspects of an example processor and other components of the example computer system 100 of FIG. 1, in accordance with one or more aspects of the present disclosure.

FIG. 4 illustrates a block diagram of an example processor 102 and other components of the computer system 100, in accordance with one or more aspects of the present disclosure. Referring to FIG. 4, the processor core 490 may include a fetch unit 438 to fetch instructions for execution by the core 490. The instructions may be fetched from one or more storage devices, such as the memory 115 and/or other memory devices, such as a data storage device 124. The processor core 490 may further include a decode unit 440 to decode a fetched instruction into a one or more micro-operations (μops). The processor core 490 may further include a schedule unit 446 to store a decoded instruction received from the decode unit 440 until the instruction is ready to be issued, e.g., until the operand values for the decoded instruction become available. The schedule unit 446 may schedule and/or issue decoded instructions to an execution unit 450.

The execution unit 450 may include one or more arithmetic logic units (ALUs), one or more integer execution units, one or more floating-point execution unit, and/or other execution units. In certain implementations, the execution unit 450 may execute instructions out-of-order (OOO). The processor core 490 may further include a retirement unit 454 to retire executed instructions after they are committed.

The processor core 490 may further include a RAT 421, a PRF 423, a MIT 425, and logic 150 to implement data manipulation functionality as described in more details herein below. Even though in FIG. 4 the logic 150 is shown to be inside a core 490, the logic 150 may be provided elsewhere in the computer system 100. Furthermore, the logic 150 and/or some of its components may be shared among a plurality of processor cores.

Figure 5:
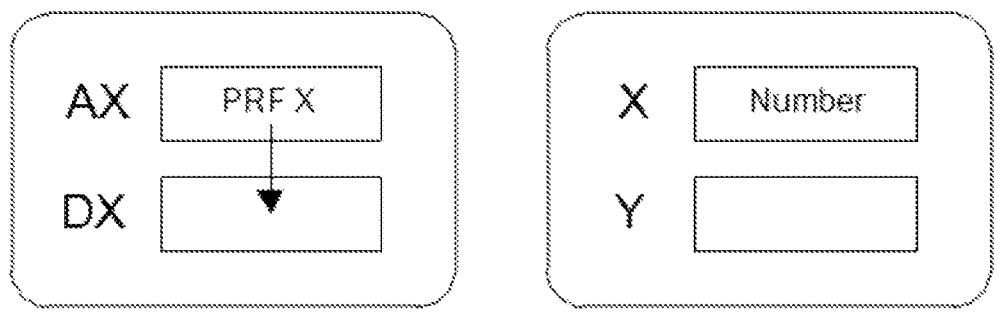
FIG. 5 schematically illustrates an example of executing a move operation by register aliasing, in accordance with one or more aspects of the present disclosure.

As noted herein above, a move instruction may be eliminated by copying the source register pointer to the destination register pointer in the RAT. FIG. 5 schematically illustrates executing MOV DX, AX instruction by register aliasing: the contents of the RAT entry for the logical register AX, which is a pointer to an entry X in PRF, gets copied to the RAT entry for the logical register DX. As illustrated by FIG. 5, in certain implementations, the PRF may be provided by an array of physical register values, and the RAT may be provided by an array of pointers to the PRF.

Before an instruction is sent to the execution unit, a PRF entry may be allocated for receiving the result of the instruction. Since multiple RAT entries may point to the same PRF entry, a PRF entry may be marked as available to use by subsequent instructions once the multiple RAT entries have been overwritten by one or more instructions which are consequently retired. A MIT may be employed for tracking references to PRF entries to determine when a PRF entry may be released for use by a new instruction.

The MIT may be provided by a two-dimensional array (e.g., a bit matrix) having a plurality of rows representing registers being tracked. Each MIT column may represent a move elimination set, in which a set bit indicates that the corresponding logical register participates in the move elimination set.

When a move operation is eliminated, bits corresponding to the source and destination logical registers are set, indicating that these logical registers are part of the move elimination set, as schematically illustrated by FIG. 6a. If the source of the move instruction is a logical register that already participates in a move elimination set, the destination logical register is added to the set, as schematically illustrated by FIG. 6b. When a logical register is overwritten by another instruction, the bit set for that register may be cleared in MIT, thus dissociating the logical register from the move elimination set, as schematically illustrated by FIG. 6c. The corresponding physical register which is not a part of any move elimination set or is the only member of a move elimination set may be reused by a new instruction once all references to the physical register have been overwritten by one or more instructions, and those instructions have retired.

In certain implementations, move elimination set tracking is performed from uop allocation to uop allocation and is not dependent on uop retirement. That is, upon allocation of a move uop, a move elimination set is created. And, further, upon allocation of a uop that overwrites a logical register, the logical register is removed from an existing move elimination set. When a uop is allocated that overwrites the last logical register in a move eliminated set, the PRF entry is marked to be freed when that overwriting uop subsequently retires. Freeing the PRF entry is dependent on uop retirement of the last overwriting uop. The logic to perform the freeing of the PRF entry is performed outside of the MIT. However, the move elimination set as implemented by the MIT can be immediately reclaimed after the last overwriting uop allocates and can be reused to track another move elimination set.

Since a move elimination set is provided by a MIT column, in order to track all possible combinations of move eliminations in N logical registers, N/2 MIT columns may be needed.

If the MIT has fewer than N/2 move elimination sets and they are all being used, the next move instruction may be sent to the execution units as a normal instruction consuming a new PRF entry. In either case, the MIT signals to the RAT whether the instruction needs to consume a PRF entry.

In a superscalar M-wide issue processor, up to M instructions per cycle may be data copying instructions, and it is possible that the MIT only has enough free sets to eliminate a subset of the issuing instructions. To further improve the execution efficiency, a processor may, instead of determining whether the move instruction is pertinent to a pre-existing or a new move elimination set, assume that each move instruction will require a new move elimination set. Hence, the processor may compare the number of available move elimination sets with the number of move instructions and select the first K move instructions to be move eliminated, while sending other move instructions to the execution unit.

FIGS. 7a-7c schematically illustrate MIT allocation and reservation logic, in accordance with one or more aspects of the present disclosure. FIG. 7a illustrates the initial state (cycle N) of the MIT: columns 1-3 are free for allocation. Subsequently, columns 1-2 are reserved for executing two move operations (MOV AX, CX and MOV R9, R8). At (N+1) cycle, as schematically illustrated by FIG. 7b. Reserve bits are set and Free bits are cleared in the MIT, to reflect the above noted allocation of columns 1-2. Subsequently, two additional move elimination opportunities present themselves to the MIT, and thus MIT column 3 is reserved for executing a third move operation (MOV BX, DX), and a fourth move operation is sent to the execution units since there are no available move elimination sets in the MIT (MOV AX, R8). At (N+2) cycle, as schematically illustrated by FIG. 7c, reservations from cycle N are canceled, and hence the respective Reserve bits are cleared. The MIT is updated with results from the instructions of cycle N, merging into column 0 and creating a new set in column 2. Empty bits are re-calculated in view of the MIT update, and Free bits are updated, by subtracting Reserve bit from Empty bit for the affected MIT columns. Hence, there may be a two-cycle latency for the MIT sets to be updated with a new move elimination information.

When only one register mapping remains in a move elimination set, so that the corresponding PRF entry has only one reference remaining, the move elimination set provided by an MIT column may still not be available for allocation to another move instruction. Such a set may be referred to as an "orphan" set, since it has only one register mapping. Without some action to clear an orphan set, it may remain unavailable until the last logical register is overwritten, thus reducing the number of possible move eliminations.

In certain implementations, the processor may detect and clear orphan move elimination sets as part of MIT allocation search. If a move elimination set is determined to be an orphan set, the processor may assert a clear signal for the next cycle that will free the set for allocation. Hence, the orphan set may become available in three or more cycles, including two cycles for the initial allocation write and one more cycle for clearing the orphan set, as described in more details herein below.

FIGS. 8a-8c schematically illustrate one example of the MIT orphan reclamation logic functioning, in accordance with one or more aspects of the present disclosure. FIG. 8a schematically represents the initial state (referred to as cycle N) of an MIT column, before executing a move instruction and a subsequent instruction that partially overwrites the newly allocated move elimination set. FIG. 8b schematically represents the state of the MIT column after being updated in cycle N+2. The MIT column at this stage is an orphan set, and may be detected as such. FIG. 8c schematically represents the state of the MIT column after the orphan reclamation. It should be noted, however, that if a move eliminated instruction in cycle N+1 used AX register as its source, there would be no orphan reclamation in cycle N+3, since the move elimination set would be updated with the results of the instruction from cycle N+1.

In certain implementations, the logic 150 may pre-compute dependencies for two or more data manipulation operations, and then perform a single MIT update to reflect the results of the two or more operations, thus improving both timing and power consumption aspects of the move elimination operations. The MIT update can include creating a new move elimination set, modifying a move elimination set, or reclaiming an orphan move elimination set.

Unlike a serialized update logic, the logic 150 updates the MIT once to reflect the results of two or more data manipulation operations. Intermediate MIT states, which would be reflected by corresponding MIT updates in a serialized update sequence, are not performed by logic 150. For example, if a register is added to a move elimination set and is overwritten by the next operation, the MIT will not reflect the intermediate state of the move elimination set containing the register.

In order to pre-compute dependencies for two or more data manipulation operations, the logic 150 may detect several type of move operations, including but not limited to: a move operation having a destination register which is used as the source of a subsequent move operation in the same processing line, as schematically illustrated by FIGS. 9a-9c; two move operations in the same line using the same register as the source, as schematically illustrated by FIGS. 10a-10c; and a move operation having a destination register matching a source of a subsequent move operation with an intervening write to the destination/source register, as schematically illustrated by FIG. 11a-11c.

In order to detect the above referenced combinations, the logic 150 may compare sources and destinations of several instructions, determine whether move instructions have been selected for move elimination, determine whether the source of a move elimination operation is present in an already existing move elimination set, and determine if any logical registers involved in new or existing move elimination sets are subsequently overwritten. In view of the determined MIT column allocation data, the logic 150 may generate new data to be written into the affected MIT columns, select new or existing data as the update data associated with each instruction, bypass data from one instruction to another utilizing the source and destination comparisons referenced above, and update the MIT.

Figure 12:
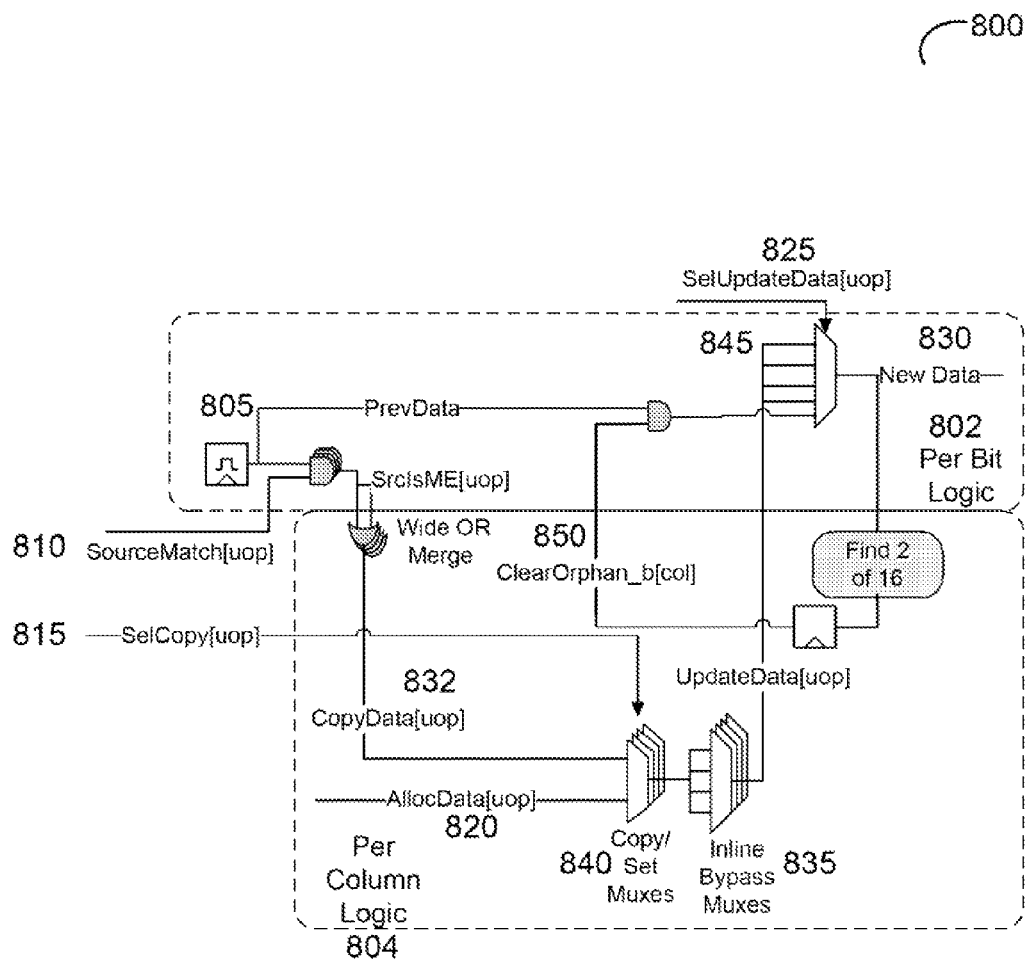
FIG. 12 schematically illustrates an example circuit implementing the move elimination logic, in accordance with one or more aspects of the present disclosure.

As noted herein above, the move elimination logic may be implemented in hardware or software or combination thereof. An example circuit 800 implementing the logic 150 is schematically shown in FIG. 12.

The circuit 800 may comprise Per Bit Logic 802 corresponding to a particular logical register in a particular MIT column (move elimination set). The circuit 800 may further comprise Per Column Logic 804 corresponding to a particular MIT column (move elimination set).

The circuit 800 may receive several input signals, including the PreviousData signal 805 reflecting the previous state of the MIT for each matrix bit; the SourceMatch signal 810 per row that identifies each move elimination instruction in the processing line that has a logical source that matches the row; the SelectorCopy signal 815 per processing line instruction identifying whether to copy data from one MIT row to another (move elimination instruction logical source row to move elimination instruction logical destination row), thereby adding the destination logical register from a move elimination instruction to a previously existing move elimination set (also disassociating it from all other move elimination sets); and the AllocationData signal 820 containing new data per processing line instruction to be written into an MIT row. This data may either be zero to clear the logical register identified by the MIT row from all move elimination sets, or it may contain data to assign the logical register to a move elimination set. The circuit 800 may process the above referenced signals to yield a new MIT Data output signal 830.

The CopyData signal 832 may be generated by qualifying the existing MIT data with the SourceMatch signal to select data from one row in the MIT representing a logical register that is the source of a move instruction.

The Copy/Set multiplexer 840 controlled by the SelectorCopy signal 815 may select a CopyData signal or an AllocData signal. SelectorCopy indicates that data from a MIT row representing the source of a move instruction should be written into another row representing the destination of a move instruction thus adding the destination register to an existing move elimination set. The SelectorCopy signal is set when the logic 150 determines that the source of a move elimination instruction already participates in a move eliminated set and that logical register has not been overwritten by a previous instruction in the processing line. Participation in a move eliminated set is determined by qualifying a row from the MIT using the SourceMatch signal 810 and checking to see if any bits in the row are set.

The control for the Inline Bypass multiplexer 835 may calculate dependencies inside the execution line, e.g., compare the destination of a first move instruction with the source of a second move instruction. Data for a previous instruction may be bypassed to a later instruction in 835 if a dependency is detected. The output signal of the Inline Bypass multiplexer 835 may be fed to the input of the Update Data multiplexer 845. Another input of the Update Data multiplexer 845 may be provided by the PreviousData signal 805, qualified by the ClearOrphan signal 850 indicating whether there is only one bit set in the MIT column. The Update Data multiplexer 845 controlled by the Selector Update Data signal 825 may output the New MIT Data signal 850. The Selector Update Data Signal 825 is priority encoded so that bypassed data from the last reference to the logical register is output to New MIT Data signal 850.

Functioning of the logic 150 as implemented, e.g., by circuit 800, is further illustrated with references to examples of FIGS. 9-11. FIGS. 9a-9c schematically illustrate a move operation having a destination register which is used as the source of a subsequent move operation in the same processing line, provided by an example chain move AX→BX→CX. FIG. 9a illustrates the initial state of the MIT. FIG. 9b illustrates the MIT allocation: columns 0 and 1 being allocated for uop0 (MOV BX, AX) and uop1 (MOV CX, BX), respectively. Since the source of neither operation is a member of an existing move elimination set, the CopyData signal 832 for both uops is 0 and the SelectorCopy signal 815 will send AllocData 820 for both uops through Copy/Set Multiplexers 840 to the Inline Bypass Multiplexer 835. As illustrated by FIG. 9c, the logic 150 detects that the destination of the first move operation (MOV BX, AX) matches the source of the second move operation (MOV CX, BX). The Inline Bypass Multiplexer 835 selects the copy/allocation data corresponding to the first move operation (AllocData[Uop0]), rather than the data corresponding to the second move operation (AllocData[Uop1]), to feed as input data to the Update Data multiplexer 845. Thus, UpdateData[Uop0] and UpdateData[Uop1]

are identical. Since the outputs of the Update Data multiplexer 845 are priority-encoded, the bypassed data corresponding to the last operation that references the logical register becomes the new MIT data. The Update Data multiplexer 845 selects the data corresponding to the first move operation (UpdateData[Uop0]) as the new data for AX, and bypassed data corresponding to the second move operation (UpdateData[Uop1]) as the new data for both BX and CX, since the second move operation is the last operation to reference these registers. However, because of the bypass mechanism, the same data is written to all three entries.

FIGS. 10*a*-10*c* schematically illustrate two move operations in one line using the same register as the source, provided by the example of MOV BX, DX; MOV AX, DX. FIG. 10*a* illustrates the initial state of the MIT. FIG. 10*b* illustrates the MIT allocation: columns 1 and 2 being allocated for uop0 (MOV BX, DX) and uop1 (MOV AX, DX), respectively. Since the source of neither operation is a member of an existing move elimination set, the CopyData signal 832 is 0 for both uops and the SelectorCopy signal 815 will send AllocData 820 for both uops through Copy/Set Multiplexers 840 to the Inline Bypass Multiplexer 835. As illustrated by FIG. 10*c*, similar to the example of FIGS. 9*a*-9*c*, the logic 150 determines whether to select the copy or allocation data for the first move operation. For the second move operation, the logic 150 logic determines that the move operation shares the source with a previous move eliminated operation, and hence the Inline Bypass Multiplexer 835 selects the copy/allocation data corresponding to the first move operation (AllocData [Uop0]), rather than the data corresponding to the second move operation (AllocData[Uop1]), to feed as the input data to the Update Data multiplexer 845. Thus, UpdateData[uop0] and UpdateData[uop1] are identical. The Update Data multiplexer 845 selects the data corresponding to the first move operation as the new data for BX (UpdateData[uop0]), and bypassed data corresponding to the second move operation as the new data for both DX and AX (UpdateData[uop1]), since the second move operation is the last operation to reference these registers. However, because of the bypass mechanism, the same data is written to all three entries.

FIGS. 11*a*-11*c* schematically illustrate an example of two move instructions in a line where a move chain is broken by an intervening write to a move eliminated register (MOV BX, AX; overwrite BX; MOV DX, BX). FIG. 11*a* illustrates the initial state of the MIT. FIG. 11*b* illustrates the MIT allocation: MIT columns 1 and 2 being allocated for uop0 (MOV BX, AX) and uop2 (MOV DX, BX), respectively. As illustrated by FIG. 11*c*, similar to the examples of FIGS. 9*a*-9*c* and 10*a*-10*c*, the logic 150 determines whether the sources of the move operations are already members of existing move elimination sets, and feeds the corresponding data to the Copy/Set multiplexer 840. In this case, the Copy/Set multiplexer 840 passes through CopyData[uop0] for uop 0, AllocData[uop1] for uop 1 and AllocData [uop2] for uop 2. Note that AllocData for uop 1 is all zeros because it does not create a move elimination set, rather it would remove the register from any set. The logic 150 determines that the source of the second move operation matches the destination of the first move operation, and that an intervening operation overwrites the register. Hence, the bypass mechanism is cancelled, and the results of the three move operations are processed separately: AX receives the data of the first move operation (CopyData [Uop0] signal), and BX and DX receive the data of the second move operation (AllocData[Uop2]). Since the inputs of the Update Data multiplexer 845 are priority-encoded, the data corresponding to the second move operation becomes the new data for BX. Thus, no intermediate updates of BX placing it into MIT column 0, removing it from column 0, and then placing it into column 2 have been made, due to the bypass logic operation.

In certain implementations, the processor may eliminate move instructions inside the integer general purpose logical register (INT) and Streaming Single Instruction Multiple Data (SIMD) Extensions (SSE) logical register domains. The SSE domain may also contain the logical register domain for the Advanced Vector Extensions (AVX) which is a superset domain of SSE. To further improve the efficiency of the implementation, the processor may reserve move elimination sets in both SSE and INT MITs for each move operation, irrespective of the types of the registers involved in the move operation. Notwithstanding potentially reducing the number of move eliminations actually performed, since an SSE move operation may reserve an INT move elimination set that otherwise could have been used by an INT instruction, the above described unified reservation mechanism may further improve the overall efficiency of the instruction execution by the processor.

Thus, the bypass MIT design described herein improves the processor performance by reducing delays for MIT updates due to parallel computations, performing active clearing of orphan columns, and implementing a unified reservation mechanism.

Figure 13:
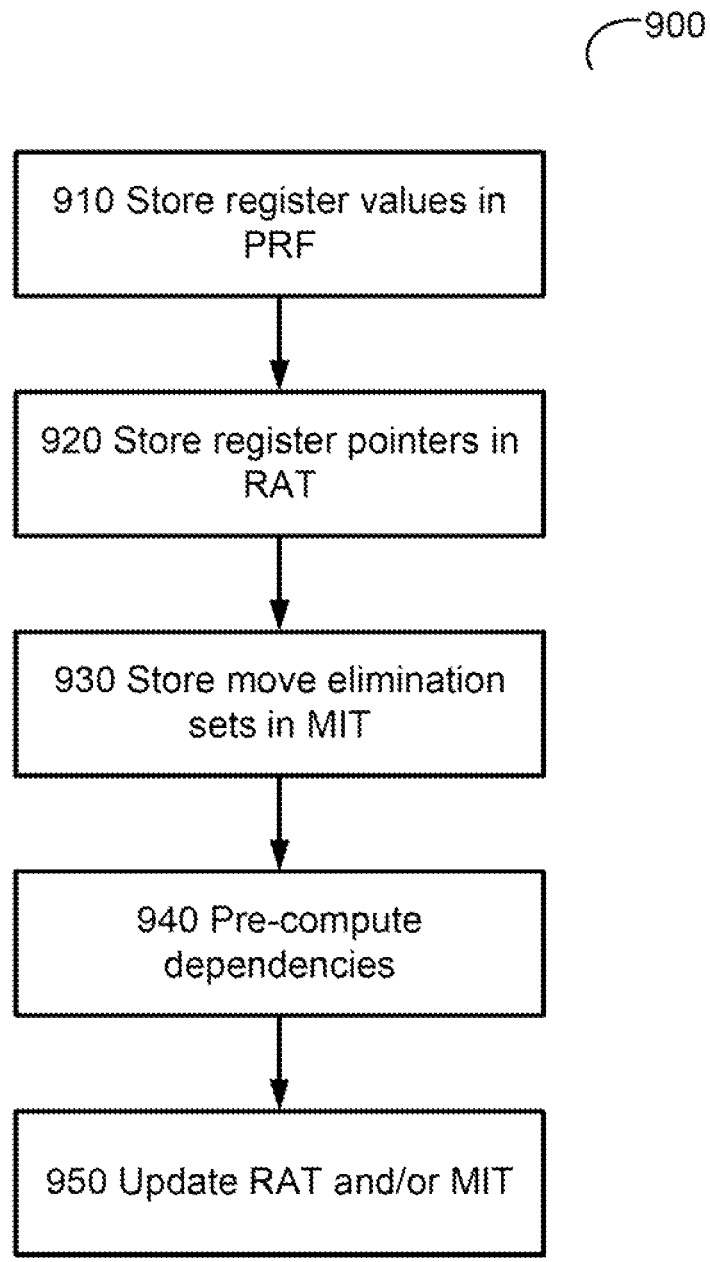
FIG. 13 depicts a flow diagram of an example method, in accordance with one or more aspects of the present disclosure.

FIG. 13 depicts a flow diagram of an example method for move elimination with bypass MIT, in accordance with one or more aspects of the present disclosure. The method 900 may be performed by a computer system that may comprise hardware (e.g., circuitry, dedicated logic, and/or programmable logic), software (e.g., instructions executable on a computer system to perform hardware simulation), or a combination thereof. The method 900 and/or each of its functions, routines, subroutines, or operations may be performed by one or more physical processors of the computer system executing the method. Two or more functions, routines, subroutines, or operations of method 900 may be performed in parallel or in an order which may differ from the order described above. In one example, as illustrated by FIG. 13, the method 900 may be performed by the computer system 100 of FIG. 1.

Referring to FIG. 13, at block 910, a processor may store a plurality of register values in a PRF.

At block 920, the processor may store a plurality of pointers in a RAT, each RAT pointer referencing a PRF element.

At block 930, the processor may store a plurality of move elimination sets in an MIT. Each move elimination set may comprise a plurality of bits representing a plurality of logical registers.

At block 940, the processor may pre-compute dependencies for two or more data manipulation operations.

At block 950, the processor may reflect results of the two or more data manipulation operations by updating the RAT and/ or the MIT. As noted herein above, in certain implementations, the processor may pre-compute dependencies for two or more data manipulation operations and then perform a single MIT update to reflect the results of the two or more operations, thus improving both timing and power consumption aspects of the move elimination operations. Upon completing the operations referenced by block 950, the method may terminate.

Figure 14:
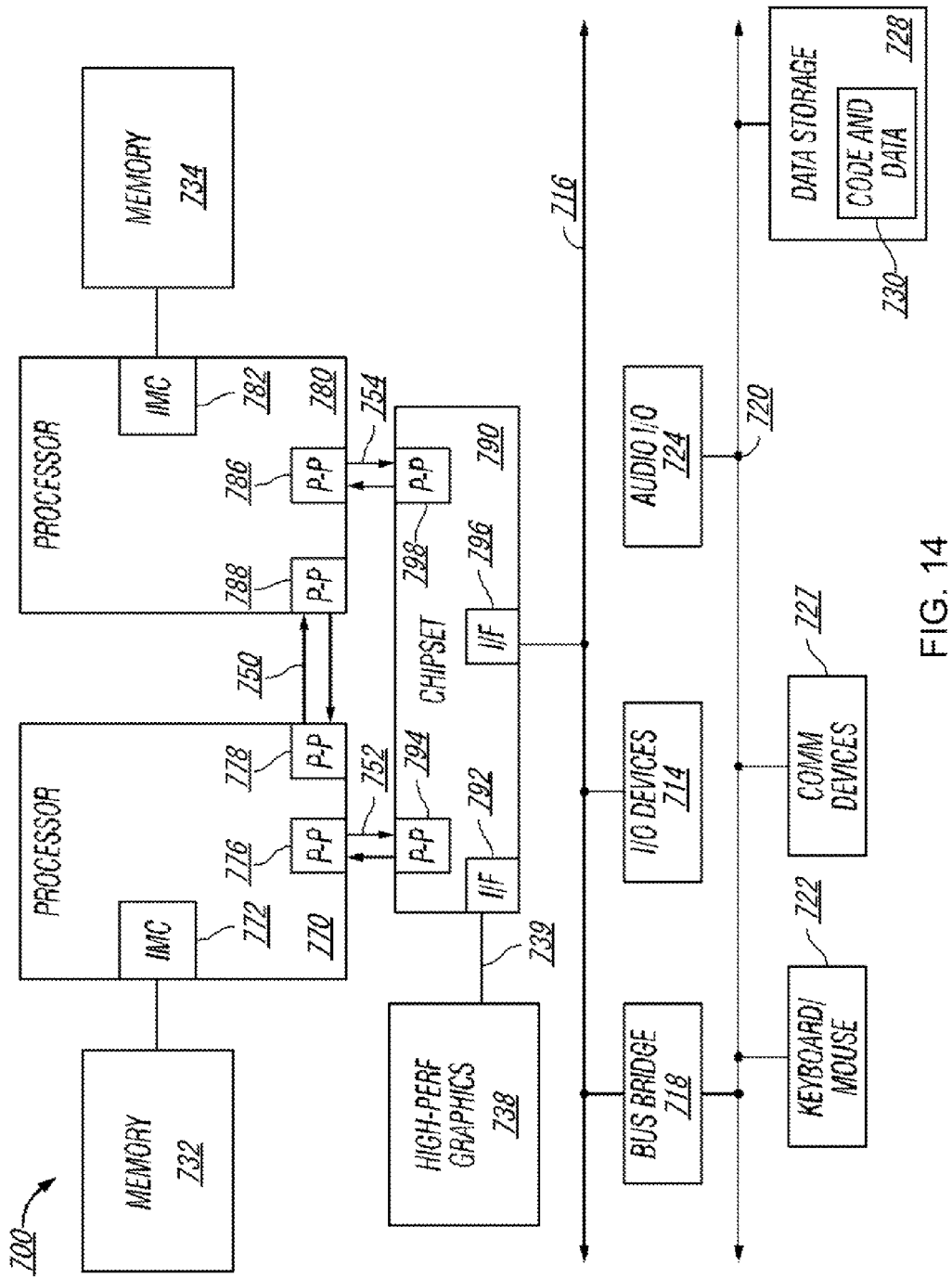
FIG. 14 depicts a block diagram of an example computer system, in accordance with one or more aspects of the present disclosure.

FIG. 14 depicts a block diagram of an example computer system, in accordance with one or more aspects of the present disclosure. As shown in FIG. 14, multiprocessor system 700 is a point-to-point interconnect system, and includes a first processor 770 and a second processor 780 coupled via a point-to-point interconnect 750. Each of processors 770 and 780 may be some version of the processor 102 capable of executing transactional memory access operations and/or non-transactional memory access operations, as described in more details herein above.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 14, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 14, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 14, a system may implement a multi-drop bus or other such architecture.

The following examples illustrate various implementations in accordance with one or more aspect of the present disclosure.

Example 1 is a processing system, comprising: a first data structure configured to store a plurality of physical register values; a second data structure configured to store a plurality of pointers, each pointer referencing an element of the first data structure; a third data structure including a plurality of move elimination sets, each move elimination set comprising a plurality of bits representing a plurality of logical registers; and a logic configured to perform a data manipulation operation by causing an element of the second data structure to reference an element of the first data structure, the logic further configured to reflect results of two or more data manipulation operations by performing a single update of the third data structure.

In Example 2, the update of the third data structure of the processing system of Example 1 may comprise at least one of: creating a move elimination set, modifying a move elimination set, or reclaiming a move elimination set.

In Example 3, the logic of the processing system of Example 1 may be configured to update the third data structure based on pre-computing dependencies of two or more data manipulation operations.

In Example 4, the logic of the processing system of Example 1 may be configured to reserve at least one of: a first move elimination set in an integer general purpose logical register domain or a second move elimination set in a Streaming Single Instruction Multiple Data (SIMD) Extensions (SSE) logical register domain.

In Example 5, the logic of the processing system of Example 1 may be configured to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 6, the logic of the processing system of Example 1 may be configured to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

Example 7 is a method of performing a data manipulation operation, comprising: storing, by a computer system, a plurality of physical register values in a first data structure; storing, in a second data structure, a plurality of pointers, each pointer referencing an element of the first data structure; storing, in a third data structure, a plurality of move elimination sets, each move elimination set comprising a plurality of bits representing a plurality of logical registers; performing a data manipulation operation by causing an element of the second data structure to reference an element of the first data structure; and reflecting results of two or more data manipulation operations by performing a single update of the third data structure.

In Example 8, updating the third data structure of the method of Example 7 may comprise at least one of: creating a move elimination set, modifying a move elimination set, or reclaiming a move elimination set.

In Example 9, the method of Example 7 may further comprise reserving at least one of: a first move elimination set in an integer general purpose logical register domain or a second move elimination set in a Streaming Single Instruction Multiple Data (SIMD) Extensions (SSE) logical register domain.

In Example 10, the method of Example 7 may further comprise outputting a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 11, the method of Example 7 may further comprise detecting at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

In Example 12, updating the third data structure of the method of Example 7 may be performed based on pre-computing dependencies of two or more data manipulation operations.

Example 13 is a processing system, comprising: a first data structure configured to store a plurality of physical register values; a second data structure configured to store a plurality of pointers, each pointer referencing an element of the first data structure; a third data structure including a first plurality of move elimination sets and a second plurality of move elimination sets, each move elimination set of the first plurality of move elimination sets comprising a plurality of bits representing a plurality of integer logical registers, each move elimination set of the second plurality of move elimination sets comprising a plurality of bits representing a plurality of Streaming Single Instruction Multiple Data (SIMD) Extensions (SSE) logical registers; and a logic configured to reserve a first move elimination set of the first plurality of move elimination sets and a second move elimination set of the second plurality of move elimination sets, the logic further configured to perform a data manipulation operation by updating the second data structure and one of: the first move elimination set or the second move elimination set.

In Example 14, the logic of the processing system of Example 13 may be further configured to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 15, the logic of the processing system of Example 13 may be further configured to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

In Example 16, the logic of the processing system of Example 13 may be further configured to: pre-compute dependencies of two or more data manipulation operations; and reflect results of the two or more data manipulation operations by performing a single update of the third data structure In Example 17, the logic of the processing system of Example 13 may be further configured to perform at least one of: creating a move elimination set, modifying a move elimination set, or reclaiming a move elimination set.

Example 18 is a method of performing a data manipulation operation, comprising: storing, by a computer system, a plurality of physical register values in a first data structure; storing, in a second data structure, a plurality of pointers, each pointer referencing an element of the first data structure; storing, in a third data structure, a first plurality of move elimination sets and a second plurality of move elimination sets, each move elimination set of the first plurality of move elimination sets comprising a plurality of bits representing a plurality of integer logical registers, each move elimination set of the second plurality of move elimination sets comprising a plurality of bits representing a plurality of Streaming Single Instruction Multiple Data (SIMD) Extensions (SSE) logical registers; reserving a first move elimination set of the first plurality of move elimination sets and a second move elimination set of the second plurality of move elimination sets; and performing a data manipulation operation by updating the second data structure and one of: the first move elimination set or the second move elimination set.

In Example 19, the method of Example 18 may further comprise outputting a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 20, the method of Example 18 may further comprise detecting at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

In Example 21, the method of Example 18 may further comprise: pre-computing dependencies of two or more data manipulation operations; and reflecting results of the two or more data manipulation operations by performing a single update of the third data structure.

In Example 22, the method of Example 18 may further comprise: performing at least one of: creating a move elimination set, modifying a move elimination set, or reclaiming a move elimination set.

Example 23 is a computer-readable non-transitory storage medium comprising executable instructions that, when executed by a computer system, cause the computer system to perform operations, comprising: storing, by a computer system, a plurality of physical register values in a first data structure; storing, in a second data structure, a plurality of pointers, each pointer referencing an element of the first data structure; storing, in a third data structure, a plurality of move elimination sets, each move elimination set comprising a plurality of bits representing a plurality of logical registers; performing a data manipulation operation by causing an element of the second data structure to reference an element of the first data structure; and reflecting results of two or more data manipulation operations by performing a single update of the third data structure.

In Example 24, updating the third data structure of Example 23 may comprise at least one of: creating a move elimination set, modifying a move elimination set, or reclaiming a move elimination set.

In Example 25, the executable instructions stored on the computer-readable non-transitory storage medium of Example 23 may further cause the computer system to update the third data structure based on pre-computing dependencies of two or more data manipulation operations.

In Example 26, the executable instructions stored on the computer-readable non-transitory storage medium of Example 23 may further cause the computer system to reserve at least one of: a first move elimination set in an integer general purpose logical register domain or a second move elimination set in a Streaming Single Instruction Multiple Data (SIMD) Extensions (SSE) logical register domain.

In Example 27, the executable instructions stored on the computer-readable non-transitory storage medium of Example 23 may further cause the computer system to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 28, the executable instructions stored on the computer-readable non-transitory storage medium of Example 23 may further cause the computer system to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

Example 29 is a computer-readable non-transitory storage medium comprising executable instructions that, when executed by a computer system, cause the computer system to perform operations, comprising: storing a plurality of physical register values in a first data structure; storing, in a second data structure, a plurality of pointers, each pointer referencing an element of the first data structure; storing, in a third data structure, a first plurality of move elimination sets and a second plurality of move elimination sets, each move elimination set of the first plurality of move elimination sets comprising a plurality of bits representing a plurality of integer logical registers, each move elimination set of the second plurality of move elimination sets comprising a plurality of bits representing a plurality of Streaming Single Instruction Multiple Data (SIMD) Extensions (SSE) logical registers; reserving a first move elimination set of the first plurality of move elimination sets and a second move elimination set of the second plurality of move elimination sets; and performing a data manipulation operation by updating the second data structure and one of: the first move elimination set or the second move elimination set.

In Example 30, the executable instructions stored on the computer-readable non-transitory storage medium of Example 29 may further cause the computer system to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

In Example 31, the executable instructions stored on the computer-readable non-transitory storage medium of Example 29 may further cause the computer system to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

In Example 32, the executable instructions stored on the computer-readable non-transitory storage medium of Example 29 may further cause the computer system to: pre-compute dependencies of two or more data manipulation operations; and reflect results of the two or more data manipulation operations by performing a single update of the third data structure In Example 33, the executable instructions stored on the computer-readable non-transitory storage medium of Example 29 may further cause the computer system to perform at least one of: creating a move elimination set, modifying a move elimination set, or reclaiming a move elimination set.

Example 34 is an apparatus comprising: a memory and a processing system coupled to the memory, wherein the processing system is configured to perform the method of any of the Examples 7-12.

Example 34 is an apparatus comprising: a memory and a processing system coupled to the memory, wherein the processing system is configured to perform the method of any of the Examples 18-22.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
   a first data structure to store a plurality of physical register values;
   a second data structure to store a plurality of pointers, each pointer referencing an element of the first data structure;
   a third data structure including a plurality of move elimination sets, each move elimination set comprising a plurality of bits representing a plurality of logical registers; and
   a logic to perform a data manipulation operation by causing an element of the second data structure to reference an element of the first data structure, the logic further to reflect results of two or more data manipulation operations by performing a single update of the third data structure.

2. The processing system of claim 1, wherein the update of the third data structure comprises at least one of: creating a move elimination set, modifying a move elimination set, or reclaiming a move elimination set.

3. The processing system of claim 1, wherein the logic is to update the third data structure based on pre-computing dependencies of two or more data manipulation operations.

4. The processing system of claim 1, wherein the logic is further to reserve at least one of: a first move elimination set in an integer general purpose logical register domain or a second move elimination set in a Streaming Single Instruction Multiple Data (SIMD) Extensions (SSE) logical register domain.

5. The processing system of claim 1, wherein the logic is to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

6. The processing system of claim 1, wherein the logic is to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

7. A method, comprising:
    storing, by a computer system, a plurality of physical register values in a first data structure;
    storing, in a second data structure, a plurality of pointers, each pointer referencing an element of the first data structure;
    storing, in a third data structure, a plurality of move elimination sets, each move elimination set comprising a plurality of bits representing a plurality of logical registers;
    performing a data manipulation operation by causing an element of the second data structure to reference an element of the first data structure; and
    reflecting results of two or more data manipulation operations by performing a single update of the third data structure.

8. The method of claim 7, wherein updating the third data structure comprises at least one of: creating a move elimination set, modifying a move elimination set, or reclaiming a move elimination set.

9. The method of claim 7, further comprising reserving at least one of: a first move elimination set in an integer general purpose logical register domain or a second move elimination set in a Streaming Single Instruction Multiple Data (SIMD) Extensions (SSE) logical register domain.

10. The method of claim 7, further comprising outputting a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

11. The method of claim 7, further comprising detecting at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

12. The method of claim 7, wherein updating of the third data structure is performed based on pre-computing dependencies of two or more data manipulation operations.

13. A processing system, comprising:
    a first data structure to store a plurality of physical register values;
    a second data structure to store a plurality of pointers, each pointer referencing an element of the first data structure;
    a third data structure including a first plurality of move elimination sets and a second plurality of move elimination sets, each move elimination set of the first plurality of move elimination sets comprising a plurality of bits representing a plurality of integer logical registers, each move elimination set of the second plurality of move elimination sets comprising a plurality of bits representing a plurality of Streaming Single Instruction Multiple Data (SIMD) Extensions (SSE) logical registers; and
    a logic to reserve a first move elimination set of the first plurality of move elimination sets and a second move elimination set of the second plurality of move elimination sets, the logic further to perform a data manipulation operation by updating the second data structure and one of: the first move elimination set or the second move elimination set.

14. The processing system of claim 13, wherein the logic is further to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

15. The processing system of claim 13, wherein the logic is further to detect at least one of: a first data manipulation operation having a destination register matching a source of a second data manipulation operation, two data manipulation operations using a common register as a source with an intervening write to the source register, two data manipulation operations using a common register as a source, a first data manipulation operation having a destination register matching a source of a second data manipulation operation with an intervening write to the destination register, or a first data manipulation operation overwriting a register referenced by an existing move elimination set and being a source of a second data manipulation operation.

16. The processing system of claim 13, wherein the logic is further to:
    pre-compute dependencies of two or more data manipulation operations; and reflect results of the two or more data manipulation operations by performing a single update of the third data structure.

17. The processing system of claim 13, wherein the logic is further to perform at least one of: creating a move elimination set, modifying a move elimination set, or reclaiming a move elimination set.

18. A computer-readable non-transitory storage medium comprising executable instructions that, when executed by a computer system, cause the computer system to perform operations, comprising:
   storing, by a computer system, a plurality of physical register values in a first data structure;
   storing, in a second data structure, a plurality of pointers, each pointer referencing an element of the first data structure;
   storing, in a third data structure, a plurality of move elimination sets, each move elimination set comprising a plurality of bits representing a plurality of logical registers;
   performing a data manipulation operation by causing an element of the second data structure to reference an element of the first data structure; and
   reflecting results of two or more data manipulation operations by performing a single update of the third data structure.

19. The computer-readable non-transitory storage medium of claim 18, wherein the executable instructions further cause the computer system to reserve at least one of: a first move elimination set in an integer general purpose logical register domain or a second move elimination set in a Streaming Single Instruction Multiple Data (SIMD) Extensions (SSE) logical register domain.

20. The computer-readable non-transitory storage medium of claim 18, wherein the executable instructions further cause the computer system to output a signal to update the third data structure, by processing at least one of: a first signal reflecting a previous state of the third data structure, a second signal identifying a source logical register for a data manipulation operation, a third signal identifying a destination logical register for a data manipulation operation, a fourth signal identifying whether an existing move elimination set contains at least one reference, a fifth signal identifying a new move elimination set within the third data structure, and a sixth signal identifying whether the data manipulation operation has been selected for move elimination.

* * * * *